United States Patent

Easley

[15] 3,686,895
[45] Aug. 29, 1972

[54] DAMPED SHAFT COUPLING

[72] Inventor: Sydney Eugene Easley, Indianapolis, Ind.

[73] Assignee: General Motors Corporation, Detroit, Mich.

[22] Filed: March 19, 1971

[21] Appl. No.: 126,144

[52] U.S. Cl. .................................. 64/1 V, 64/23
[51] Int. Cl. ............................................. F16d 3/06
[58] Field of Search ................. 64/1 R, 1 V, 9, 23

[56] References Cited

UNITED STATES PATENTS

| | | |
|---|---|---|
| 3,016,722 | 1/1962 | Batdorf .......................... 64/1 |
| 3,263,450 | 8/1966 | Condon ........................... 64/1 |
| 3,508,418 | 4/1970 | Jones .............................. 64/23 |

*Primary Examiner*—Kenneth W. Sprague
*Attorney*—Paul Fitzpatrick and Jean L. Carpenter

[57] ABSTRACT

Two shafts are splined together for transmission of torque, one being supported by the other. To damp vibration in the shafting which causes wear, an O-ring lodged between overlapping portions of the shafts adjacent the splines is compressed radially by them to the extent of about one-fourth of its original radial thickness.

2 Claims, 3 Drawing Figures

PATENTED AUG 29 1972
3,686,895
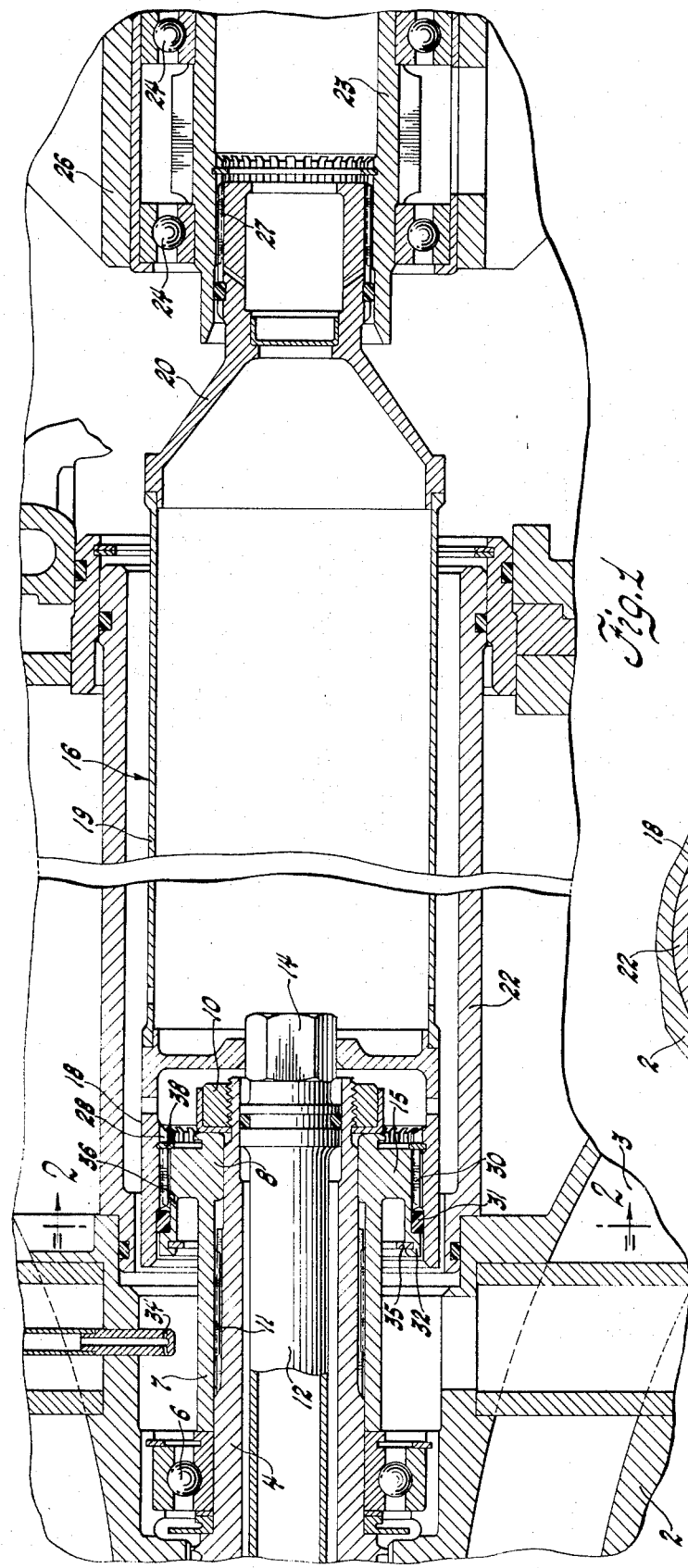
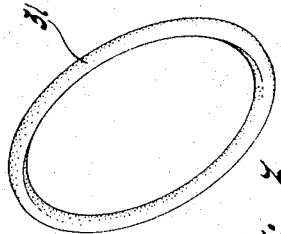
Fig.3
Fig.2
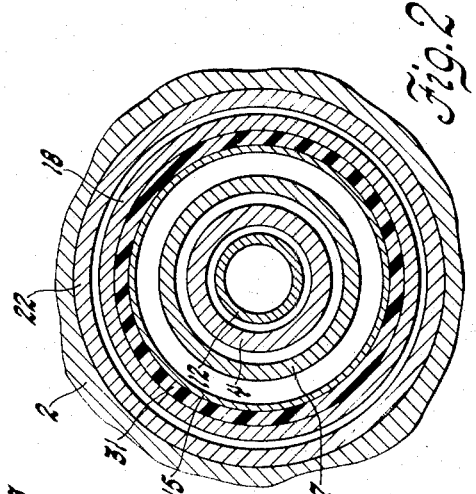
Fig.1
INVENTOR.
Sydney E. Easley
BY
Paul Fitzpatrick
ATTORNEY

DAMPED SHAFT COUPLING

The invention herein described and claimed was made in the course of work under a contract with the Department of Defense.

DESCRIPTION

My invention relates to improvements in shaft couplings and particularly to provision for damping vibration which may otherwise occur in shafts having splined connections.

The invention arose from difficulty with a splined connection in a shaft transmitting power to a compressor test rig in which vibration resulted in fretting of the splines and a short life for the splined parts.

It occurred to me in the course of redesigning the driving shaft arrangement that the vibrations might be damped by mounting an overcompressed O-ring between the two shafts. Experience with the redesigned structure has shown a remarkable freedom from vibration and satisfactory freedom from wear as a result.

The principal objects of my invention are to improve rotating shaft assemblies, to provide simple and effective means for damping vibration in such assemblies, to minimize or eliminate fretting and wear in splined shaft connections, and to provide an oil seal in shaft couplings which serves also as means for damping vibrations in the coupled shafting.

The nature of my invention and its advantages will be clear to those skilled in the art from the succeeding detailed description of a practical embodiment of the invention.

Referring to the drawings,

FIG. 1 is a sectional view, taken on a plane containing the axis of rotation, of a shaft installation in a compressor test rig.

FIG. 2 is a partial sectional view taken on the plane indicated by the line 2—2 in FIG. 1.

FIG. 3 is an axonometric view of an O-ring.

Referring first to FIG. 1, this illustrates partially a test rig in which the compressor of the well-known T63 gas turbine engine is mounted for test, the nature of the test being immaterial to an understanding of my invention. The test involves driving the rotor of the compressor from an external power source. My invention is shown embodied in shafting for this purpose.

Considering first the environment of the invention, the fixed stator structure 2 corresponding to the compressor stator defines an annular outlet 3 from the compressor rotor (not illustrated in detail) which includes a shaft 4, only a portion of which adjacent the discharge end of the compressor is shown. Shaft 4 is mounted in a ball bearing 6 in the stator 2 and a forward bearing (not illustrated). A sleeve 7 piloted on the shaft adjacent the bearing 6 and also at the area 8 is retained on the shaft abutting the inner race of bearing 6 by a nut 10. Sleeve 7 is coupled to shaft 4 by non-working splines 11. The compressor rotor includes a hollow tie bolt 12 with a hexagonal head 14. The sleeve 7 includes a coupling portion 15 which is the inner member of a splined connection to a hollow large diameter driving shaft 16. Shaft 16 includes a coupling portion 18, a tube 19, and an input end driving portion 20. These are welded together. Shaft 16 is principally enclosed in a fixed housing 22. The input end of shaft 16 is supported in a power input shaft 23, driven by a suitable power source (not illustrated), which is mounted in ball bearings 24 in a support 26. Shaft 23 is coupled to shaft 16 by splines 27.

The coupling portion 18 bears internal splines 28 which cooperate with external splines 30 on the coupling portion 15 of sleeve 7. Coupling portion 15 also includes a cylindrical seat for an O-ring 31 and defines a shoulder 32 at the opposite side of the O-ring from the splines 30. The outer end of the coupling portion 18 is cylindrical, and thus the O-ring 31 is mounted between inner and outer cylindrical surfaces of the two coupling portions. When the assembly is completed, the O-ring is located axially between the shoulder 32 and the adjacent ends of the splines 28 and 30.

In assembling the structure, the O-ring is disposed over the coupling portion 15 and the coupling portion 18 is slid over it, the latter having a chamfer at its forward end to facilitate compression of the O-ring. The O-ring is a conventional commercial oil resistant O-ring of fluorocarbon rubber. It is of toroidal shape; that is, of circular cross-section except for relatively insignificant ridges or flash from the molding operation. In the particular installation described here, the O-ring when installed is about 2 inches in diameter and about 0.144 inches in thickness of the ring, and is compressed into a radial space of approximately 0.109 inches; the resulting compression of the O-ring is approximately one-quarter of its free diameter or thickness. The result is that the O-ring serves as a yielding or resilient pilot between the two shafts and acts to center the spline sets 28 and 30. It also acts as a damper of radial vibration because such vibrations must necessarily work the elastomeric material of the O-ring and the resulting energy absorption has a strong damping effect on any vibrations which might be excited in the rotating structure. The amount of compression or radial squeeze of the O-ring in this installation is approximately twice the maximum recommended for its usual use as an oil sealing structure and approximately three or four times the usual amount of compression in oil seals.

It may be noted, however, that the O-ring continues to serve as an oil seal between the two shafts to contain oil which is necessary to lubricate the splines. Oil under pressure is supplied to a jet 34 which directs it into an annular recess bounded by the interior of the coupling portion 15 and by a dam provided by expanding ring 35. The oil retained here by cylindrical force flows through a radial port 36 to the splines. A suitable oil level is maintained at this point by a second dam defined by expanding ring 38 mounted in the coupling portion 18. Also, escape of the oil through the open end of the coupling portion 18 is prevented by the O-ring 31. Thus, it will be seen that the O-ring 31 performs a threefold function; sealing the lubricating oil, providing a resilient centering pilot for the shafts, and damping vibrations. The last function is particularly improved by the unusual amount of compression of the O-ring which increases its resistance to vibratory excitation. The O-ring is effectively of higher spring rate when highly compressed.

The detailed description of the preferred embodiment of the invention for the purpose of explaining the principles thereof is not to be considered as limiting or restricting the invention, as many modifications may be made by the exercise of skill in the art without departing from the spirit of the invention.

I CLAIM:

1. A rotatable assembly comprising, in combination, a first shaft rotatably mounted, a second shaft rotatably mounted coaxially with the first shaft, the shafts having mutually overlapping portions including parts of non-circular cross-section so as to transfer torque between the shafts, one shaft being supported by the other at the overlapping portions, and an elastomeric 0-ring mounted and contained between the overlapping portions having its radial thickness limited by bounding surfaces of the shafts to less than the radial thickness approved for fluid sealing applications of the said 0-ring, the 0-ring being provided for damping vibration during rotation of the shafts.

2. A rotatable assembly comprising, in combination, a first shaft rotatably mounted, a second shaft rotatably mounted coaxially with the first shaft, the shafts having mutually overlapping portions including splines operative to transfer torque between the shafts, one shaft being supported by the other at the overlapping portions, and an elastomeric 0-ring mounted and contained between the overlapping portions having its radial thickness limited by bounding surfaces of the shafts to less than five-sixths of the uncompressed radial thickness of the said 0-ring, the 0-ring being effective to damp vibration generated during rotation of the shafts.

* * * * *